United States Patent
Kim et al.

(10) Patent No.: US 7,290,501 B2
(45) Date of Patent: Nov. 6, 2007

(54) SYSTEM AND METHOD FOR RELAXING LAYING HEN

(75) Inventors: Sang Ho Kim, Gyeonggi-do (KR); Sang Jin Lee, Gyeonggi-do (KR); Ok Seok Seo, Daejeon (KR); Yong Chang Kim, Daejeon (KR); Chun Ho Moon, Seoul (KR)

(73) Assignees: Republic of Korea (Management Government Office: Rural Development Administration), Gyeonggi-Do (KR); Daeyang E&C Co., Ltd, Seoul (KR)

(*) Notice: Subject to any disclaimer, the term of this patent is extended or adjusted under 35 U.S.C. 154(b) by 82 days.

(21) Appl. No.: 11/005,011

(22) Filed: Dec. 7, 2004

(65) Prior Publication Data

US 2005/0120976 A1  Jun. 9, 2005

(30) Foreign Application Priority Data

Dec. 8, 2003  (KR) .............. 10-2003-0088463

(51) Int. Cl.
- *A01K 15/00* (2006.01)
- *A01K 45/00* (2006.01)
- *A61M 21/00* (2006.01)

(52) U.S. Cl. .......... 119/719; 119/174; 600/28

(58) Field of Classification Search ........ 119/719, 119/174; 600/26, 27, 28; 340/573.3, 573.2
See application file for complete search history.

(56) References Cited

U.S. PATENT DOCUMENTS

| | | | | |
|---|---|---|---|---|
| 3,762,396 A | * | 10/1973 | Ballentine et al. | 600/26 |
| 4,335,710 A | * | 6/1982 | Williamson | 600/28 |
| 4,834,701 A | * | 5/1989 | Masaki | 600/28 |
| 4,883,067 A | * | 11/1989 | Knispel et al. | 600/545 |
| 5,076,281 A | * | 12/1991 | Gavish | 600/534 |
| 5,123,899 A | * | 6/1992 | Gall | 600/28 |
| 5,289,438 A | * | 2/1994 | Gall | 369/4 |
| 5,356,368 A | * | 10/1994 | Monroe | 600/28 |
| 5,719,635 A | * | 2/1998 | Han | 348/553 |
| 5,982,414 A | * | 11/1999 | Yoshida et al. | 725/116 |
| 6,206,821 B1 | * | 3/2001 | Rhee | 600/28 |
| 6,939,288 B1 | * | 9/2005 | Levin | 600/28 |
| 7,079,659 B1 | * | 7/2006 | Oohashi et al. | 381/98 |
| 2003/0225095 A1 | * | 12/2003 | McCulloch et al. | 514/249 |

FOREIGN PATENT DOCUMENTS

| JP | 7-47128 | * | 2/1995 |
|---|---|---|---|
| JP | 2003-348697 | * | 12/2003 |

\* cited by examiner

*Primary Examiner*—Yvonne R. Abbott
(74) *Attorney, Agent, or Firm*—Lowe Hauptman Ham & Berner

(57) ABSTRACT

A system for producing a sound having a certain frequency range to maintain laying hens in stable and comfortable conditions. includes a basic wave generator for generating a pair of first basic waves having the same phase and a pair of second basic waves having opposite phases, a relaxation wave generator for generating a pair of relaxation waves by combining the pair of first basic waves and the pair of second basic waves with time, a modulator for generating a pair of relaxation sounds by modulating the pair of relaxation waves with a sound wave having an audible frequency, and an audio output unit composed of two left and right parts such that stereo sound is outputted, for receiving the pair of relaxation sounds and outputting the pair of relaxation sounds to the left and right parts, respectively.

7 Claims, 2 Drawing Sheets

SYSTEM AND METHOD FOR RELAXING LAYING HEN

RELATED APPLICATIONS

The present application is based on, and claims priority from, Korea Application Ser. No. 10-2003-0088463, filed Dec. 8, 2003, the disclosure of which is hereby incorporated by reference herein in its entirety.

BACKGROUND OF THE INVENTION

1. Field of the Invention

The present invention relates to a system and method for relaxing laying hens, and more particularly to a system and method for producing a sound having a certain frequency range to maintain laying hens in more stable and comfortable conditions. More particularly, the present invention relates to a system and method for relaxing laying hens, which is capable of improving quality of eggs produced in laying hen farms, increasing egg output, and moreover, enhancing immunity of laying hens to prevent the laying hens from catching infectious diseases.

2. Description of the Related Art

In general, the business goal of laying hen farms is to make a profit by cutting down the cost of production and producing and selling eggs of good quality. Therefore, laying hen farms make diversified efforts to raise a laying egg rate and lower a mortality rate in order to maximize profits.

As a part of such efforts, laying hen farmers feed laying hens with various assorted feeds containing vitamins and minerals. However, this method is uneconomical since it increases the laying egg rate by 2% or more whereas assorted feed costs are far increased over the increase of the laying egg rate.

Laying hens are a species of poultry more sensitive to stress than other poultry. Recently, as automated facilities for management of laying hens have been employed on a large scale, stress to laying hens is increasing. Particularly, although it is natural that chickens are active in a wide space, because they are bred in a narrow space such as a henhouse in order to produce a mass of eggs, they suffer from stress naturally. Accordingly, there is an increased possibility that quality of eggs laid by stressed hens is deteriorated.

On the other hand, most animals generate diverse brain waves having certain frequency ranges. It is known that patterns of these brain waves depend on their physiological conditions. Brain waves are classified into alpha waves, a beta wave, delta waves, and theta waves.

Beta waves with a wavelength range of 15 Hz 40 Hz are generated under normal conditions where persons conduct daily activities including waking up, walking, agitation, etc.

Alpha waves with a wavelength range of 7 Hz to 15 Hz are brain waves generated when persons have relieved tension and relaxed spirit. Thus, when alpha waves predominate, persons go into a mentally stable state. Healthy persons having little stress are apt to generate this alpha wave plentifully.

The theta wave with a wavelength range of 4 Hz to 7 Hz is known to be involved with instant insight or idea, or super-ability.

The delta wave with a wavelength of 4 Hz or below is mainly generated when persons are in an asleep or unconscious state, and produces a lot of growth hormone.

Persons can be relaxed in their mind and body when they are placed in environments of natural sound, bright light, or sweet smell. At this time, brain waves of persons are also stabilized, and accordingly, alpha, theta, and delta waves, which have relatively low frequencies, are frequently observed.

BRIEF SUMMARY OF THE INVENTION

The present invention has been made in view of the problems of the conventional method for improving quality of eggs laid by laying hens by feeding the laying hens with assorted feed, and it is an object of the present invention to provide a system and method for producing a sound having a certain frequency range to maintain laying hens in more stable and comfortable conditions.

It is another object of the present invention to provide a system and method for raising a laying egg rate and lowering a mortality rate through a proper combination of sounds having certain frequency ranges.

In accordance with an aspect of the present invention, the above and other objects can be accomplished by the provision of a system for relaxing laying hens, comprising: a relaxation sound generator for generating a relaxation sound having the same frequency range as an alpha wave having a frequency range of 7 Hz to 15 Hz to make poultry relaxed, an audible sound generator for generating an audible sound heard by the poultry, a modulator for modulating the relaxation sound by mixing the relaxation sound with the audible sound, and an audio output unit for outputting the modulated relaxation sound.

In accordance with another aspect of the present invention, there is provided a system for relaxing laying hens, comprising: a basic wave generator for generating a pair of first basic waves having the same phase and a pair of second basic waves having opposite phases, a relaxation wave generator for generating a pair of relaxation waves by combining the pair of first basic waves and the pair of second basic waves with time, a modulator for generating a pair of relaxation sounds by modulating the pair of relaxation waves with a sound wave having an audible frequency, and an audio output unit composed of two left and right parts such that stereo sound is outputted, for receiving the pair of relaxation sounds and outputting the pair of relaxation sounds to the left and right parts, respectively.

Preferably, the pair of relaxation waves has a frequency range of 5 Hz to 15 Hz and is changed in its frequency with time. Preferably, the frequency change is periodically reiterated.

Preferably, the audio output unit includes a public address speaker disposed in a space where poultry can hear the modulated relaxation sound.

In accordance with yet another aspect of the present invention, there is provided a method for relaxing poultry by letting the poultry hear a relaxation sound, comprising; a first step of outputting the relaxation sound having a frequency increased with time to cheer up the poultry, a second step of outputting the relaxation sound having a frequency decreased and increased with time to relax the poultry, and a third step of outputting the relaxation sound having a frequency decreased with time to put the poultry to sleep.

Preferably, the first step includes outputting the relaxation sound having a frequency increased gradually from 10 Hz to 15 Hz, the second step includes outputting the relaxation sound having a frequency increased and decreased periodically within a range of 6 Hz to 12 Hz, and the third step includes outputting the relaxation sound having a frequency decreased gradually from 10 Hz to 5 Hz.

Preferably, mute is maintained for a preset time between the first step and the second step or between the second step and the third step.

With the above configuration, a sound having a certain frequency range can be produced to maintain laying hens in more stable and comfortable conditions.

BRIEF DESCRIPTION OF THE SEVERAL VIEWS OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, a system and method for relaxing laying hens according to preferred embodiments of the present invention will be described in detail with reference to the accompanying drawings. The following preferred embodiments are exemplified for the purpose of explaining the principle of the present invention, without limiting the claims of the present invention.

Figure 1:
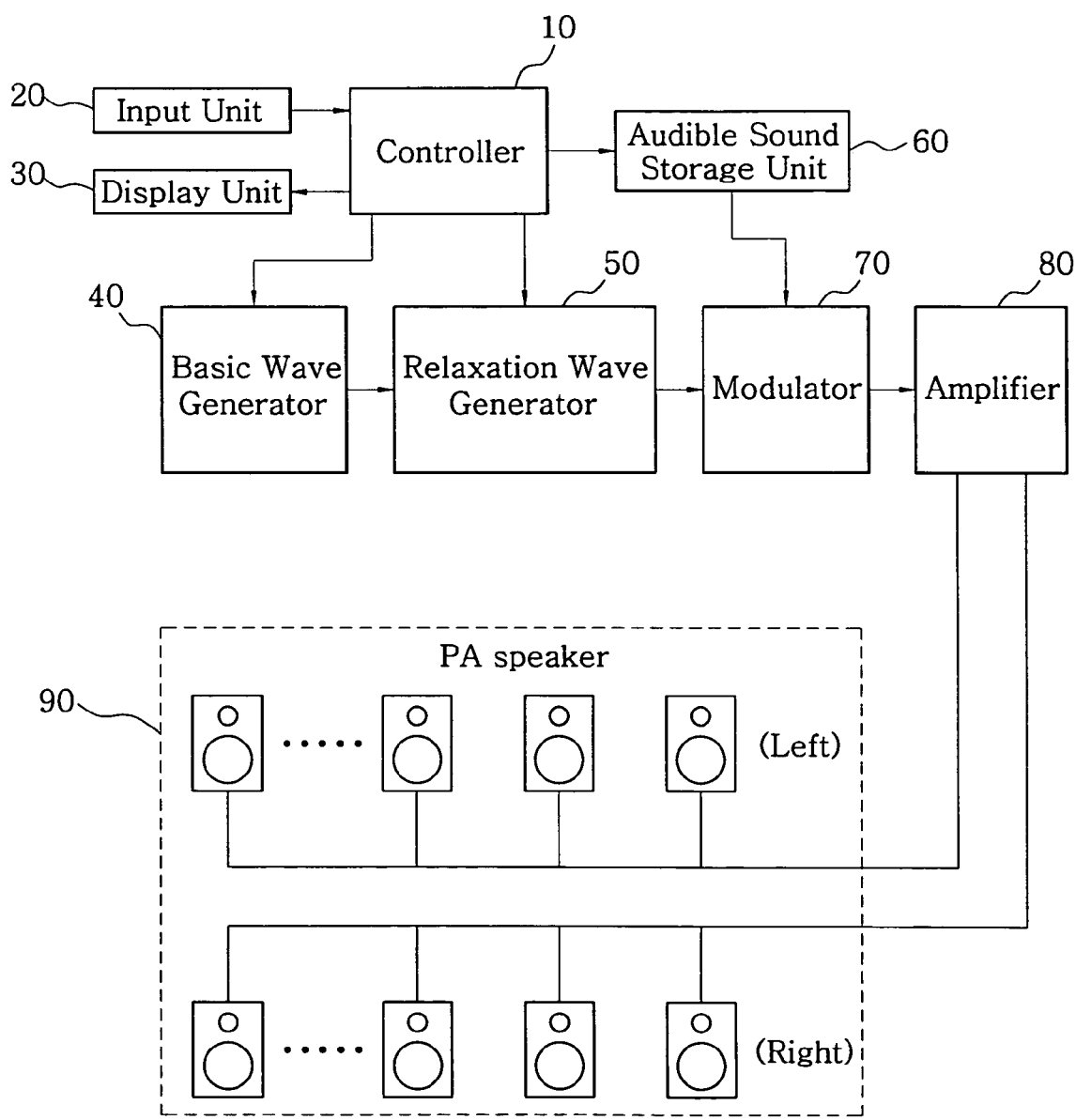
FIG. 1 is a block diagram of a system for relaxing laying hens in accordance with the present invention.

Referring to FIG. 1, a system for relaxing laying hens in accordance with the present invention comprises a controller 10, an input unit 20, a display unit 30, a basic wave generator 40, a relaxation wave generator 50, an audible sound storage unit 60, a modulator 70, an amplifier 80, and a public address (PA) speaker 90.

The controller 10 transmits a signal to the basic wave generator 40 to generate predetermined basic waves using a brain wave induction algorithm, according to instructions inputted through the input unit 20. Also, the controller 10 transmits a signal to the relaxation wave generator 50 to generate relaxation waves of various types, which can be heard by the laying hens, by combining the basic waves generated by the basic wave generator 40 with time. In addition, the controller 10 transmits a signal to the modulator 70 to modulate the relaxation waves generated by the relaxation wave generator 50 with a sound wave having an audible frequency, which can be heard by the laying hens.

Various instructions required for operation of the controller 10 are inputted to the input unit 20. Namely, instructions required to select kinds of brain waves, their frequencies, and a combination thereof with time, and stored natural sounds are transmitted to the controller 10 through the input unit 20.

The display unit 30 including an LCD monitor displays the instructions to be inputted through the input unit 20 and modes currently running in the system according to the inputted instructions.

Figure 2A:
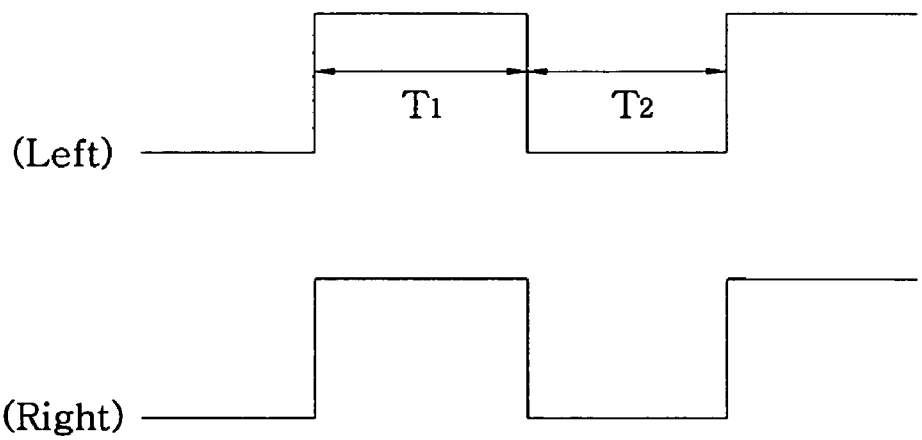
FIG. 2a is a diagram showing basic pulse waves in a mono mode in accordance with the present invention.
Figure 2B:
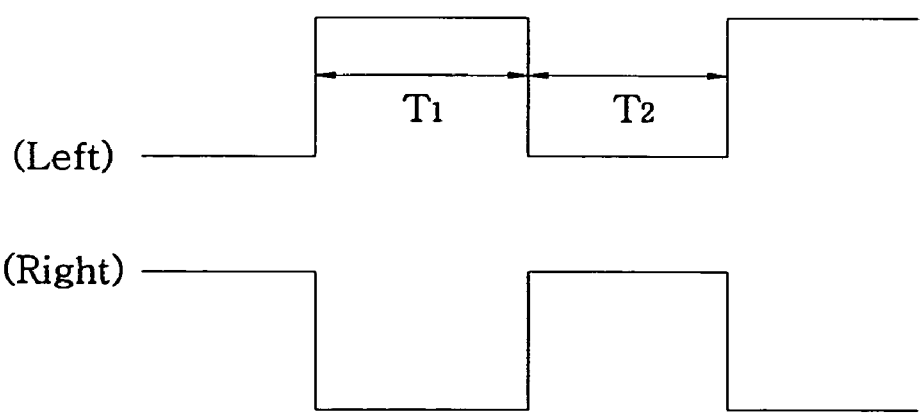
FIG. 2b is a diagram showing basic pulse waves in a stereo mode in accordance with the present invention.

The basic wave generator 40 generates basic sound waves (i.e., basic brain waves) that the laying hens can hear. The basic sound waves generated by the basic wave generator 40 are pulse waves as shown in FIGS. 2a and 2b. However, these basic sound waves are not limited to the pulse waves, but may have various shapes, such as a sinusoidal wave. The pulse waves are waves in which a sound is produced for a high period of the pulse while a sound is not produced for a low period of the pulse.

FIG. 2a shows pulse waveforms of the basic sound waves having the same phase, and FIG. 2b shows pulse waveforms of the basic sound waves having the opposite phases. Based on the phase, a mono sound is produced in the basic sound waves shown in FIG. 2a and a stereo sound is produced in the basic sound waves shown in FIG. 2b. In the present invention, sound waves having a combined frequency within a range of 5 Hz to 15 Hz may be generated by combining a time interval T1 and a time interval T2 shown in FIG. 2a.

The relaxation wave generator 50 selects various kinds of sound waves (including a plurality of sound waves having different frequencies, or a plurality of sound waves depending on a kind of operation mode including a mono mode and a stereo mode) and combines theses selected sound waves with time.

The audible sound storage unit 60 stores sound waves having audible frequency ranges. The audible sound storage unit 60 may store sounds of birds, waves, river water, sea gulls, etc., that assist in relaxing the laying hens and were collected in advance. As an audible frequency used, about 100 Hz to 500 Hz is suitable for persons, however, in the case of poultry such as the laying hens, unlike persons, appropriate frequencies must be selected based on the kind of poultry.

The frequency of the relaxation wave generated by the relaxation wave generator 50 is so low that the laying hens cannot hear the relaxation sound well. Accordingly, the modulator 70 modulates the relaxation wave having the low frequency with the audible sound. Here, any of the sound waves stored in the audible sound storage unit 60 is used as the audible sound. The audible sound is preferably a sinusoidal wave having a frequency in the several hundred Hz range, however it is not limited to this, but may include waves of various forms. Also, as the audible sound, natural sounds or sounds favorable for the laying hens may be provided. In addition, as the audible sound, a mixture of brain waves modulated with a sinusoidal wave and the natural sounds may be used.

The amplifier 80 amplifies sound waves produced in the modulator 70 and transmits the amplified sound waves to the public address (PA) speaker 90.

The PA speaker 90 is a speaker apparatus including a plurality of speakers spatially distributed in order to propagate sound waves into a wide space. In the present invention, the PA speaker 90 includes a plurality of stereo speakers disposed in a space where the laying hens can hear relaxation sounds in a wide chicken yard.

Hereinafter, operation of the relaxation wave generator 50 in accordance with the embodiment of the present invention will be described in detail in connection with a control of the time intervals T1 and T2 shown in FIGS. 2a and 2b.

Table 1 shows a time schedule of the system for relaxing the laying hens, which is made up for use in a chicken yard.

TABLE 1

| Step | Operation time | Operation mode |
|---|---|---|
| 1 | 06:00–08:00 (2 hours) | Active mode |
| 2 | 08:00–10:00 (2 hours) | Mute (operation stop) |
| 3 | 10:00–12:00 (2 hours) | Rest mode |
| 4 | 12:00–19:00 (7 hours) | Mute (operation stop) |
| 5 | 19:00–21:00 (2 hours) | Sleep mode |
| 6 | 21:00–06:00 (9 hours) | Mute (operation stop) |

As listed in Table 1, the active mode, the rest mode and the sleep mode, etc., are modes formed by a suitable combination of waves having the same left and right phases (mono mode, hereinafter referred to as "A type") with time and waves having the opposite left and right phases (stereo mode, hereinafter referred to as "B type") with time. In the mute mode, sound is not produced for a certain time.

The active mode in Step 1 is a mode for maximally promoting activities of the laying hens, such as waking up at dawn and laying eggs. Waveforms of the sound waves in the active mode are formed by a suitable combination of A type and B type, as listed in Table 2. Frequencies of the sound waves are continuously increased from about 10 Hz to 15 Hz with time. This is because the increased frequencies result in a higher speed of sound wave. In this case, a mono sound is outputted until 135 seconds, thereafter, a stereo sound is outputted until 327 seconds, and thereafter, a mono sound is again outputted until 339 seconds through the PA speaker.

TABLE 2

| Order | Waveform | T1(ms) | T2(ms) | Frequency(Hz) [1/(T1 + T2) × 1000] | Duration(sec) | Total duration(sec) |
|---|---|---|---|---|---|---|
| 1 | A | 51 | 51 | 9.80 | 2 | 2 |
| 2 | A | 50 | 50 | 10.00 | 45 | 47 |
| 3 | A | 48 | 49 | 10.31 | 45 | 92 |
| 4 | A | 48 | 48 | 10.42 | 43 | 135 |
| 5 | B | 46 | 46 | 10.87 | 34 | 169 |
| 6 | B | 44 | 44 | 11.36 | 60 | 229 |
| 7 | B | 43 | 43 | 11.63 | 50 | 284 |
| 8 | B | 41 | 41 | 12.20 | 43 | 327 |
| 9 | A | 33 | 33 | 15.15 | 12 | 339 |

TABLE 3

| Order | Waveform | T1(ms) | T2(ms) | Frequency(Hz) [1/(T1 + T2) × 1000] | Duration(sec) | Total duration(sec) |
|---|---|---|---|---|---|---|
| 1 | A | 43 | 43 | 11.63 | 20 | 20 |
| 2 | A | 45 | 45 | 11.11 | 23 | 43 |
| 3 | A | 49 | 49 | 10.20 | 23 | 66 |
| 4 | B | 54 | 54 | 9.26 | 50 | 116 |
| 5 | B | 60 | 60 | 8.33 | 120 | 236 |
| 6 | B | 74 | 74 | 6.76 | 60 | 296 |
| 7 | B | 86 | 86 | 5.81 | 44 | 340 |
| 8 | B | 73 | 73 | 6.85 | 23 | 363 |
| 9 | B | 55 | 55 | 9.09 | 300 | 663 |
| 10 | B | 40 | 40 | 12.50 | 34 | 697 |

The rest mode in Step 3 is a mode for letting the laying hens take a rest after the active As listed in Table 3, unlike the active mode, the frequency of waveform is decreased about 11 Hz to 6 Hz, and then, is increased up to 12 Hz with time. In the rest mode, the se and decrease of the frequency can be reiterated several times periodically.

The sleep mode in Step 5 is a mode for letting the laying hens sleep after the rest mode, where the frequency is decreased from about 10 Hz to 5 Hz, as listed in Table 4. Since a speed of a generated sound becomes relatively low with the decrease of the frequency, the laying hens are exposed to a more stable sound with time.

TABLE 4

| Order | Waveform | T1(ms) | T2(ms) | Frequency(Hz) [1/(T1 + T2) × 1000] | Duration(sec) | Total duration(sec) |
|---|---|---|---|---|---|---|
| 1 | A | 51 | 51 | 9.80 | 120 | 120 |
| 2 | B | 55 | 55 | 9.09 | 5 | 125 |
| 3 | B | 63 | 63 | 8.00 | 10 | 135 |
| 4 | B | 70 | 70 | 7.14 | 11 | 146 |
| 5 | B | 74 | 74 | 6.71 | 6 | 152 |
| 6 | B | 79 | 79 | 6.33 | 28 | 158 |
| 7 | B | 84 | 84 | 5.95 | 41 | 199 |
| 8 | B | 88 | 88 | 5.68 | 6 | 205 |
| 9 | A | 92 | 92 | 5.43 | 33 | 238 |
| 10 | A | 102 | 102 | 4.90 | 500 | 738 |

With the combination of the brain waves produced according to the embodiment, the present inventors made tests for examining an affect on the laying hens as follows.

According to the embodiment of the present invention, after exposing laying hens used for the tests to the brain waves according to the above-described modes for two months, the present inventors noted the amount of eggs laid for 35 days. For the purpose of comparing with the embodiment, the amount of laid eggs was examined for the same time under ordinary egg laying conditions. Results of the tests are listed in Table 5.

As described above, in the embodiment of the present invention, the frequency of the relaxation sound is increased or decreased with time within a range of about 5 to 15 Hz. This frequency range is nearly equal to the frequency range (7 Hz to 15 Hz) of the alpha wave for relaxing persons. In other words, in the embodiment of the present invention, the frequency range of the generated relaxation sound is changed to the frequency range of the alpha wave.

TABLE 5

| Division | Time | Number of eggs | Average laying egg rate(%) |
|---|---|---|---|
| Comparative example 1 | Forenoon | 1664 | 38.4 |
| | Afternoon | 1205 | 27.8 |
| | Total | 2933 | 66.2 |
| Comparative example 2 | Forenoon | 1525 | 35.2 |
| | Afternoon | 1344 | 31.0 |
| | Total | 2919 | 66.2 |
| Embodiment | Forenoon | 1845 | 42.5 |
| | Afternoon | 1286 | 29.6 |
| | Total | 3199 | 72.1 |

During the total test period, while the average laying egg rate is 66.2% in comparative examples 1 and 2, it is 72.1% in the embodiment, showing an increase of about 8.9% over the comparative examples 1 and 2. Such an increase is attributed to the relaxation of the laying hens by the relaxation sound generated according to the present invention, which has a favorable influence on the ovulation period of the laying hens, metabolism of internal nutritive substance of the laying hens, etc.

In addition, the laying hens in the environments created according to the present invention were observed to maintain a significantly stable condition and have little aggressive disposition for the test period, compared to the laying hens in the environments created according to the comparative examples.

Table 6 shows a comparison between mortality rate and alien substances in eggs in the embodiment of the present invention and those in the comparative examples.

TABLE 6

| Division | Mortality rate(%) | Meat spots and blood spots appearance rate(%) | Abnormal eggshell rate(%) |
|---|---|---|---|
| Comparative example | 3.3 | 32.9 (100) | 28.3 (100) |
| Embodiment | 0.8 (24.2) | 30.8 (93.6) | 22.9 (80.9) |

In the embodiment of the present invention, the mortality rate of the laying hens is significantly decreased by 75.8%, compared to that of the laying hens in the comparative examples. It is commonly known that the main cause of stress in chickens is cannibalism due to their aggressive disposition. Therefore, it can be considered that the decrease of the mortality rate in the embodiment leads to alleviation of the aggressive disposition of the laying hens.

On the other hand, values of eggs are mainly determined by eggshells and internal qualities. In the embodiment of the present invention, content of alien substances such as meat spots or blood spots is decreased by 6.4% at average over the overall test period, compared to that in the comparative examples. The meat spots and the blood spots appear because internal injured textures of stressed laying hens are introduced into eggs, and accordingly, they have a close connection with health conditions of the laying hens. Accordingly, it is determined that low appearance rates of the meat spots and the blood spots in eggs laid by the laying hens in the environments created according to the embodiment of the present invention is attributed to good health conditions of the laying hens.

An abnormal eggshell rate appears due to poor metabolism when eggshells are formed. The abnormal eggshell rate in the embodiment of the present invention is decreased by 19.1%, compared to that in the comparative examples.

As described above, with the system for relaxing the laying hens in accordance with the present invention, the productivity of the laying hens and the quality of produced eggs are significantly improved. Such an improvement is mainly attributed to emotional relaxation of the laying hens exposed to various kinds of stresses. The system for relaxing the laying hens in accordance with the present invention is applicable not only to the laying hens but also to other kinds of poultry. In addition, the system of the present invention is applicable to general domestic animals by adjusting the frequency range.

As apparent from the above description, the present invention provides a system and method for producing a sound having a certain frequency range to maintain poultry in more stable and comfortable conditions. Accordingly, egg output in poultry farms can be enhanced, and eggs having a good quality can be produced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for relaxing laying hens, comprising:
   a basic wave generator for generating a pair of first basic waves having the same phase and a pair of second basic waves having opposite phases;
   a relaxation wave generator for generating a pair of relaxation waves by combining the pair of first basic waves and the pair of second basic waves with time;
   a modulator for generating a pair of relaxation sounds by modulating the pair of relaxation waves with a sound wave having an audible frequency; and
   an audio output unit composed of left and right parts such that stereo sound is outputted, for receiving the pair of relaxation sounds and outputting the pair of relaxation sounds to the left and right parts, respectively.

2. The system as set forth in claim 1, wherein frequencies of the pair of first basic waves and the pair of second basic waves combined in the relaxation wave generator are changed with time.

3. The system as set forth in claim 1, wherein the audio output unit is a public address speaker disposed in a space where poultry can hear the modulated relaxation sound.

4. The system as set forth in claim 1, wherein the pair of relaxation waves has a frequency range of 5 Hz to 15 Hz.

5. The system as set forth in claim 4, wherein the audio output unit is a public address speaker disposed in a space where poultry can hear the modulated relaxation sound.

6. The system as set forth in claim 1, wherein the relaxation wave generator produces a pair of relaxation wave periodically by combining the pair of first basic waves and the pair of second basic waves with time.

7. The system as set forth in claim 6, wherein the audio output unit is a public address speaker disposed in a space where poultry can hear the modulated relaxation sound.

* * * * *